United States Patent [19]

Takada

[11] 4,447,074
[45] May 8, 1984

[54] BELT TRANSFER RING FOR PASSIVE VEHICLE OCCUPANT SEAT BELT SYSTEMS

[76] Inventor: Juichiro Takada, 3-12-1, Shinmachi, Setagayaku, Tokyo, Japan

[21] Appl. No.: 277,958

[22] Filed: Jun. 26, 1981

[30] Foreign Application Priority Data

Jun. 27, 1980 [JP] Japan .............................. 55-89466[U]
Jul. 15, 1980 [JP] Japan .............................. 55-98845[U]
Aug. 28, 1980 [JP] Japan .............................. 55-121255[U]

[51] Int. Cl.³ .............................................. B60R 21/10
[52] U.S. Cl. .................................................... 280/804
[58] Field of Search ............................... 280/802, 804; 403/324–327, 328, 329; 292/150, 152, 175, 179, 180, 166

[56] References Cited

U.S. PATENT DOCUMENTS

| | | | |
|---|---|---|---|
| 954,671 | 4/1910 | Danker | 403/324 |
| 1,186,885 | 6/1916 | Cook | 403/324 |
| 1,851,843 | 3/1932 | Inman | 403/327 |
| 2,153,102 | 4/1939 | Smith | 292/180 |
| 3,552,158 | 1/1971 | Van Lengen | 292/166 |
| 3,999,291 | 12/1976 | Boer | 292/166 |
| 4,179,143 | 12/1979 | Shy | 292/179 |
| 4,200,308 | 4/1980 | Irwin et al. | 280/804 |
| 4,256,331 | 3/1981 | Schwanz et al. | 280/804 |

Primary Examiner—Robert B. Reeves
Assistant Examiner—Dennis H. Pedder
Attorney, Agent, or Firm—Brumbaugh, Graves, Donohue & Raymond

[57] ABSTRACT

A belt transfer ring that can be quickly and easily connected to and disconnected from a slider comprises a body having a slot that receives a coupling portion of the slider and a pair of holes, one on either side of the slot. A coupling pin is received through an opening in one side of the body and extends through one of the holes in the body and a hole in the coupling portion of the slider and into or through the other of the holes in the body. The pin is retained in the coupling position by a device that is accessible from outside the body to enable the pin to be moved out of the coupling position.

4 Claims, 21 Drawing Figures

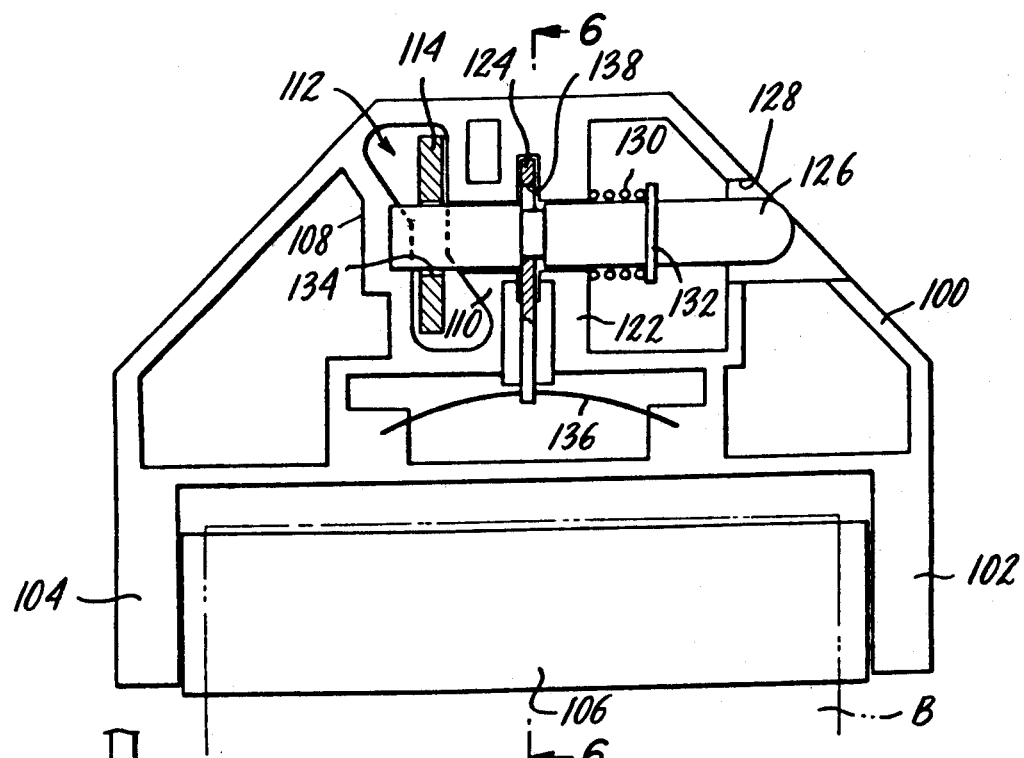
FIG. 4
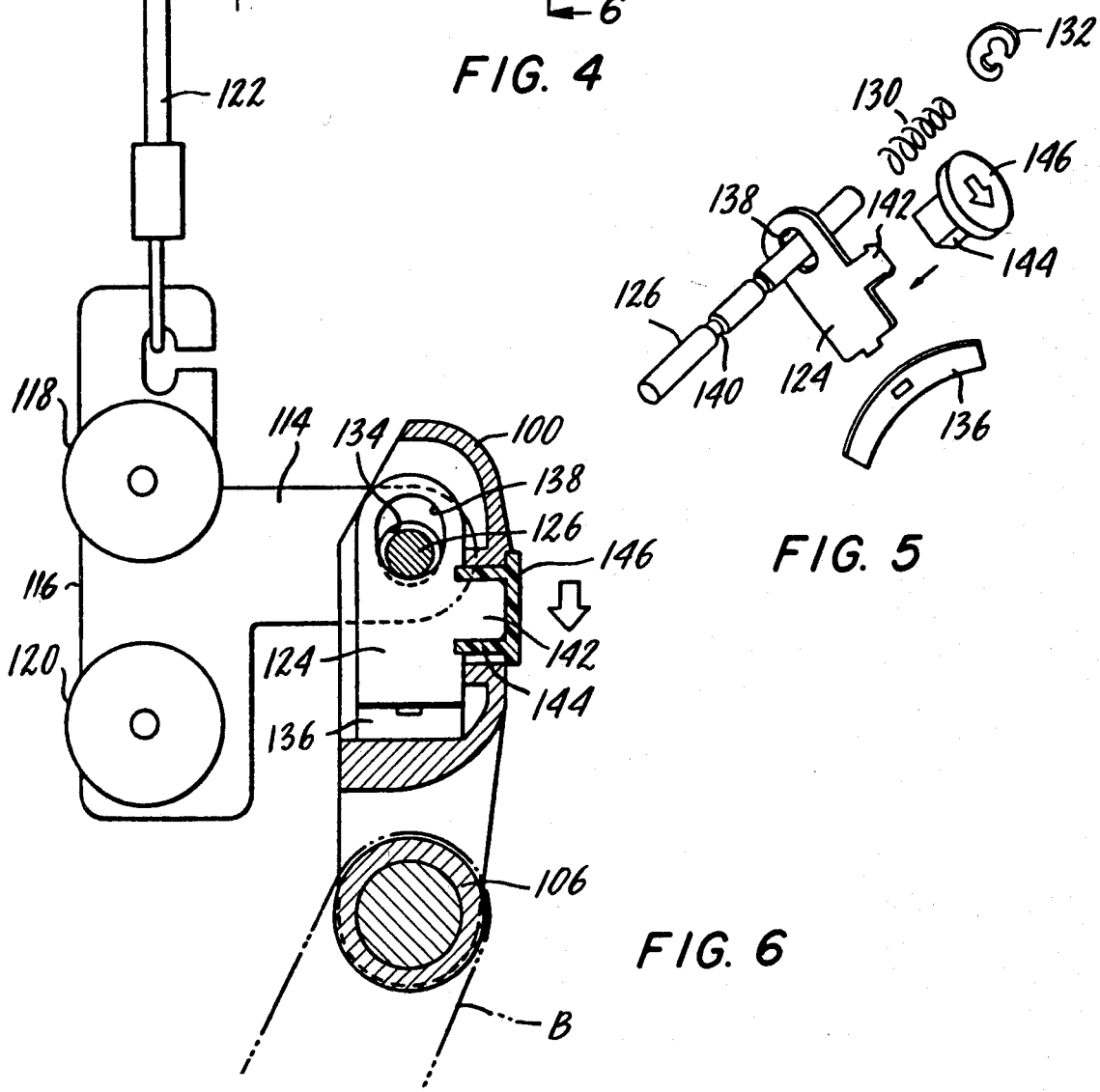
FIG. 5
FIG. 6

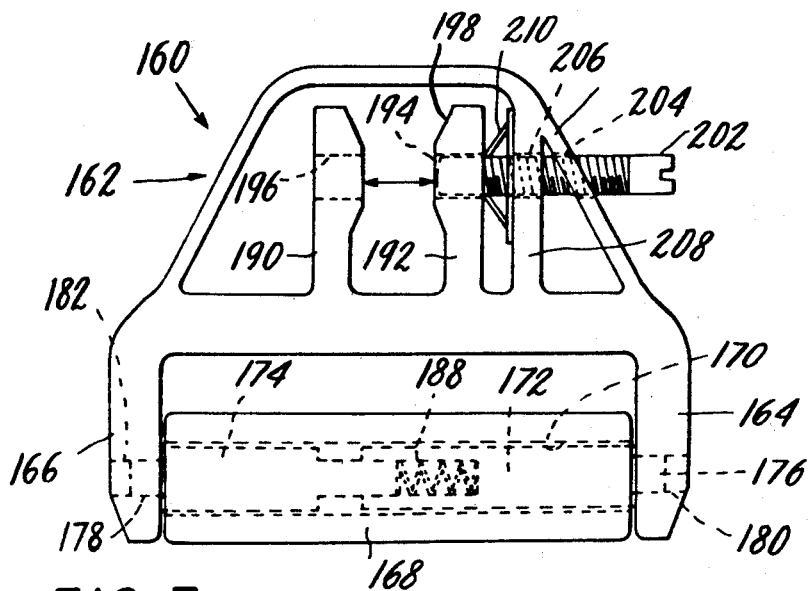
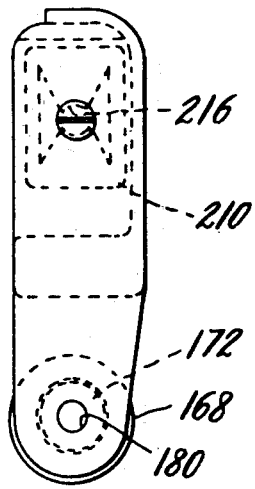
FIG. 7
FIG. 8
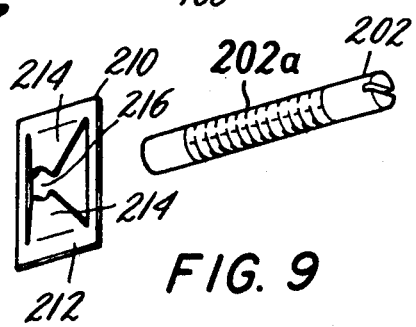
FIG. 9
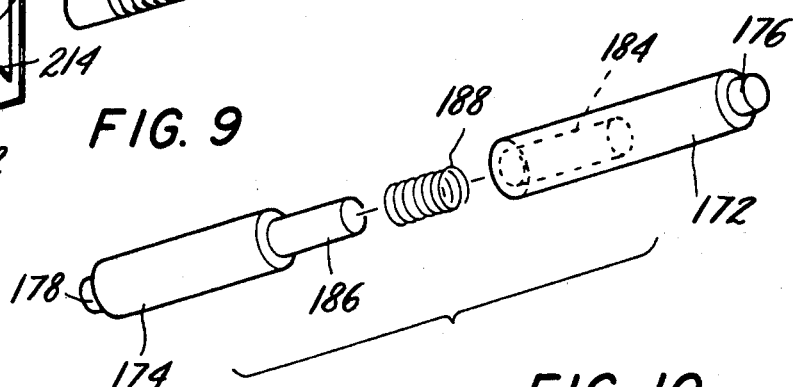
FIG. 10
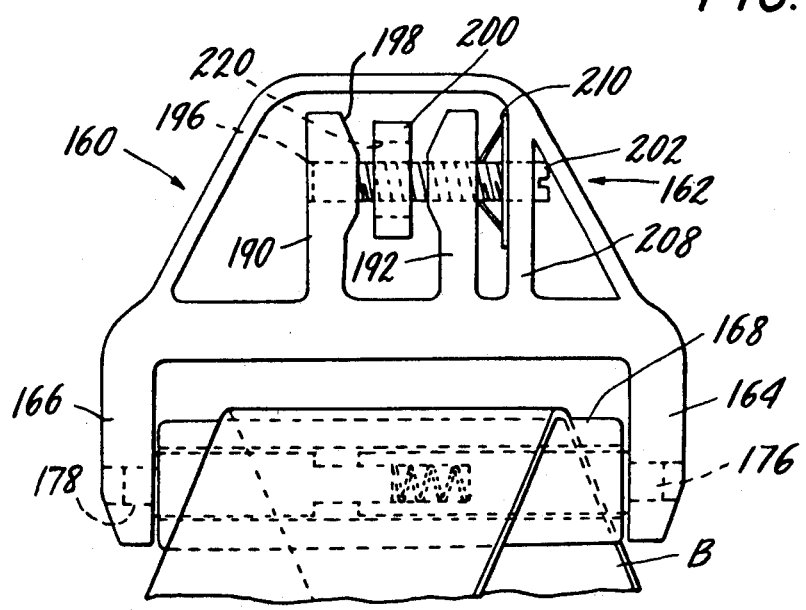
FIG. 11

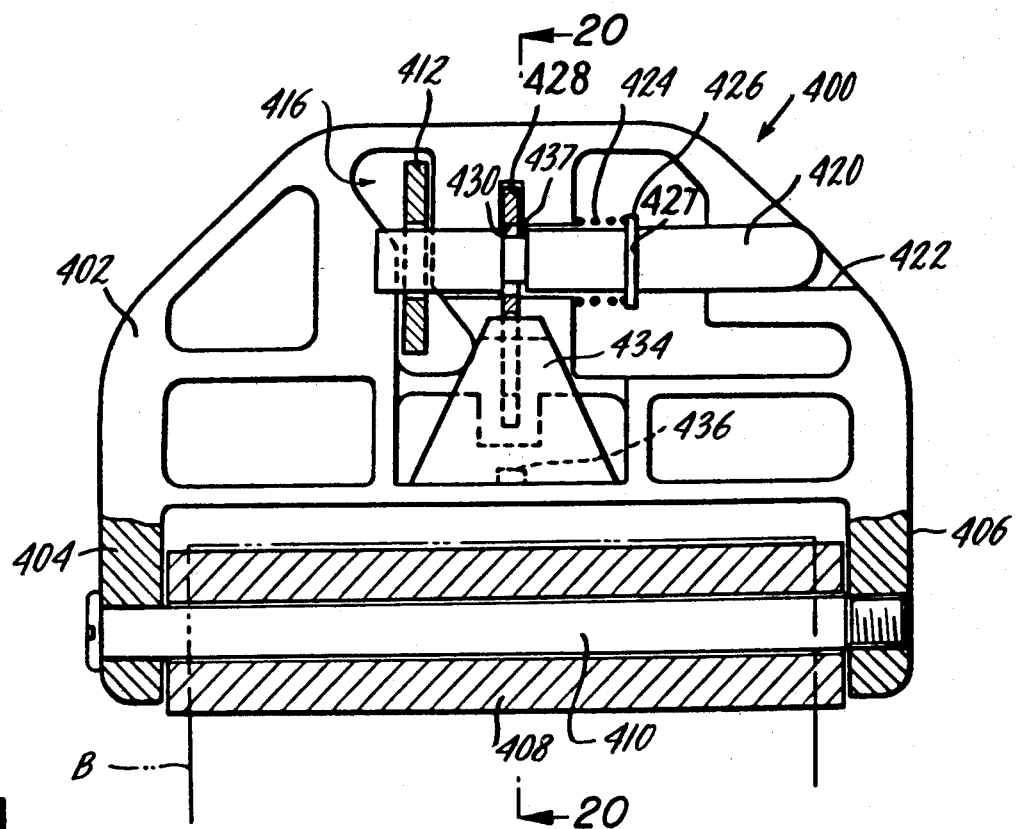
FIG. 19
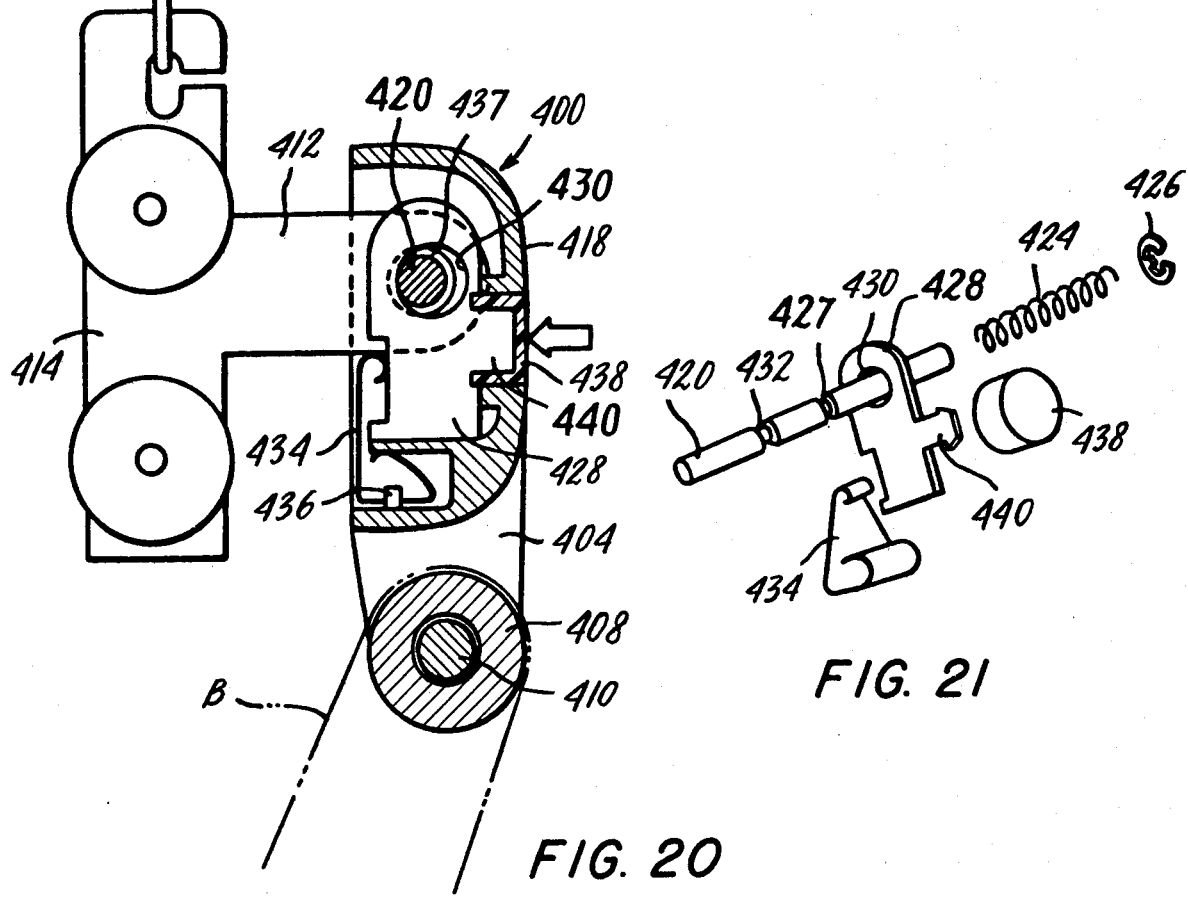
FIG. 20
FIG. 21

BELT TRANSFER RING FOR PASSIVE VEHICLE OCCUPANT SEAT BELT SYSTEMS

FIELD OF THE INVENTION

The present invention relates to passive vehicle occupant safety belt systems and, in particular, to a belt transfer ring that can be quickly and easily connected to a slider.

BACKGROUND OF THE INVENTION

There have been numerous proposals in recent years for passive vehicle occupant safety belt systems in which a portion of the belt passes through a belt transfer ring. The ring, in turn, is carried by a slider that is driven by a drive device back and forth along a guide rail between a restraint position in which the belt is positioned in a restraint configuration in engagement with the vehicle's occupant and a release position in which the restraint belt is in a release configuration out of the way of the occupant so he or she can enter or leave the vehicle. The belt transfer ring may be associated with a shoulder belt, a lap belt or both a shoulder belt and lap belt. For example, passive systems have been proposed in which the outboard end of the belt is anchored above and behind the occupant, a guide rail is installed generally above vehicle door, and the shoulder belt passes through the belt transfer ring, which is moved with the slider back and forth along the guide rail. Other systems have been proposed in which the guide rail is in the door and a lap belt is transferred between a restraint and release configuration. Various three-point passive systems also employ belt transfer rings. The present invention is suitable for use with many of the systems that are described generally above.

Ordinarily, vehicle manufacturers acquire the components for restraint belt systems from various vendors and receive the components in sub-assemblies or "groups". Each group of components received from the vendor must be manufactured in such a way as to facilitate, to the greatest extent possible, the assembly of the system in the vehicle as it is being built. Probably the most convenient way of installing a passive belt system is to assemble it from two groups of components. The first group, which can be called the "belt group," includes the belts, buckles, retractors, transfer rings and other components that are physically located within the passenger compartment of the vehicle, as distinguished from components that are hidden away in the vehicle body, within the door or in other places which require that they be installed before the finishing and trim elements within the passenger compartment are installed. The latter components make up the "drive-guide group," which comprises either a gear-reduced electric motor or a mechanical motion amplifier for driving the belt transfer ring, the drive wire, the guide rail and the slider.

Inasmuch as the slider is part of the drive-guide group, while the belt transfer ring is part of the belt group, the final connection of the belt group to the drive-guide group has been a cause of considerable trouble, and a satisfactory solution has heretofore not been put forward. In previously known systems, it has been necessary for the drive device to be attached to the vehicle only after interconnection is made between the belt group and the drive-guide group or for the belt to be passed through the belt transfer ring only after the drive device is installed. These limitations in the order of assembly have constituted a significant disadvantage common to many passive belt systems.

The problems described above that are encountered in the initial assembly of the system in the vehicle are also encountered in repairing the system. With presently known arrangements, it is often necessary to disassemble many components of both the belt group and the drive-guide group in order to work on only certain components of one or the other group. Thus, repair procedures involve a substantial amount of time, require special tools and are the cause of considerable inconvenience and expense.

SUMMARY OF THE INVENTION

The present invention provides a solution for the assembly and repair difficulties in certain passive belt systems of a type that utilize a belt transfer ring. The invention is a belt transfer ring that is constructed in such a way that it can be easily and quickly connected to and disconnected from the slider, either during the initial assembly of the vehicle or during any repair procedure carried out on any part of the passive system. The transfer ring includes a body having a slot that is adapted to receive a coupling portion of a slider. A coupling pin is removably received in a pair of holes in the body, one such hole being on either side of the slot, and through a hole in the slider, thereby coupling the transfer ring to the slider. The coupling pin extends through one of the pair of holes in the body and into, and through in some embodiments, the other of the pair of holes in the body. The coupling pin is releaseably retained in the coupling position by a retaining device that is operable from outside the body to enable the pin to be released from the coupling position.

The invention can be carried out in various ways. For example, the coupling pin can be released by a spring that urges it in a direction such that it moves out of the hole in the slider, and the retainer means may be a latch member that is shiftable between a position in engagement with the pin to hold it in the coupling position and a position out of engagement with the pin to enable the spring to shift the pin out of the hole in the slider, and thereby release the transfer ring from the slider. In such an arrangement, the latch member may be held by a spring in engagement with the pin, the spring being yieldable to release the latch from the pin by moving a portion of the latch that is accessible from outside the body of the belt transfer ring. In one arrangement, for example, the latch includes an elongated hole through which the pin passes, and the pin includes a groove providing a shoulder that is engaged by a part of the latch adjacent the hole. Upon sliding the latch so that it does not engage the groove in the pin, the pin is released and moves from the coupling position to release the transfer ring from the slider.

Among other possible arrangements, many of which are shown in detail in the accompanying drawings, are the use of a resilient latch member that is self-positionable in engagement within an abutment on the pin and thereby holds the pin in the coupling position. In another arrangement, a spring resiliently urges the pin into the coupling position and holds it there, and a portion of the coupling pin is accessible from outside the body for engagement to be moved in a direction opposed to the urging of the spring. In another example, the pin is releaseably retained in the coupling position by screw threads on the pin and on an element or portion associated with the body.

Among the advantages of the invention are the capability of quickly and easily connecting or disconnecting the transfer ring from the slider, usually without any special tool or any tool at all. The invention provides considerable savings in the time and cost of initially assembling the belt system when the vehicle is assembled and the disassembly and reassembly of the system for repair during the life of the vehicle. The invention is of comparatively simple construction and can be manufactured at relatively low cost, particularly when compared with the savings made possible by eliminating the above-described problems with known assembly techniques.

For a better understanding of the invention reference may be made to the following description of exemplary embodiments, taken in conjunction with the figures of the accompanying drawings.

DESCRIPTION OF THE DRAWINGS

FIG. 4 is the rear plan view of a second embodiment of the present invention.

FIG. 5 is an exploded view of some of the components of the embodiment of FIG. 4.

FIG. 6 is a side cross-sectional view of the embodiment of FIGS. 4 and 5 taken generally along the plane defined by the lines 6—6 of FIG. 4 and in the direction of the arrows.

FIG. 7 is a rear elevational view of a third embodiment of the present invention.

FIG. 8 is a side elevational view of the embodiment shown in FIG. 7.

FIG. 9 is an exploded pictorial view of the coupling pin and a speed nut used in the embodiment of FIGS. 7 to 12.

FIG. 10 is a pictorial, exploded view of some parts of the belt transfer ring shown in FIGS. 7 to 12.

FIG. 11 is a rear elevational view of the embodiment of FIGS. 7 to 12 shown in the coupling position.

FIG. 19 is a rear pictorial view of a tenth embodiment, portions being broken away in cross section.

FIG. 20 is an end cross-sectional view of the embodiment of FIGS. 19 to 21 taken generally along a plane designated by the lines 20—20 and in the direction of the arrows.

FIG. 21 is an exploded pictorial view of the coupling and latching components of the embodiments of FIGS. 19 to 21.

DESCRIPTION OF EXEMPLARY EMBODIMENTS

Figure 1:
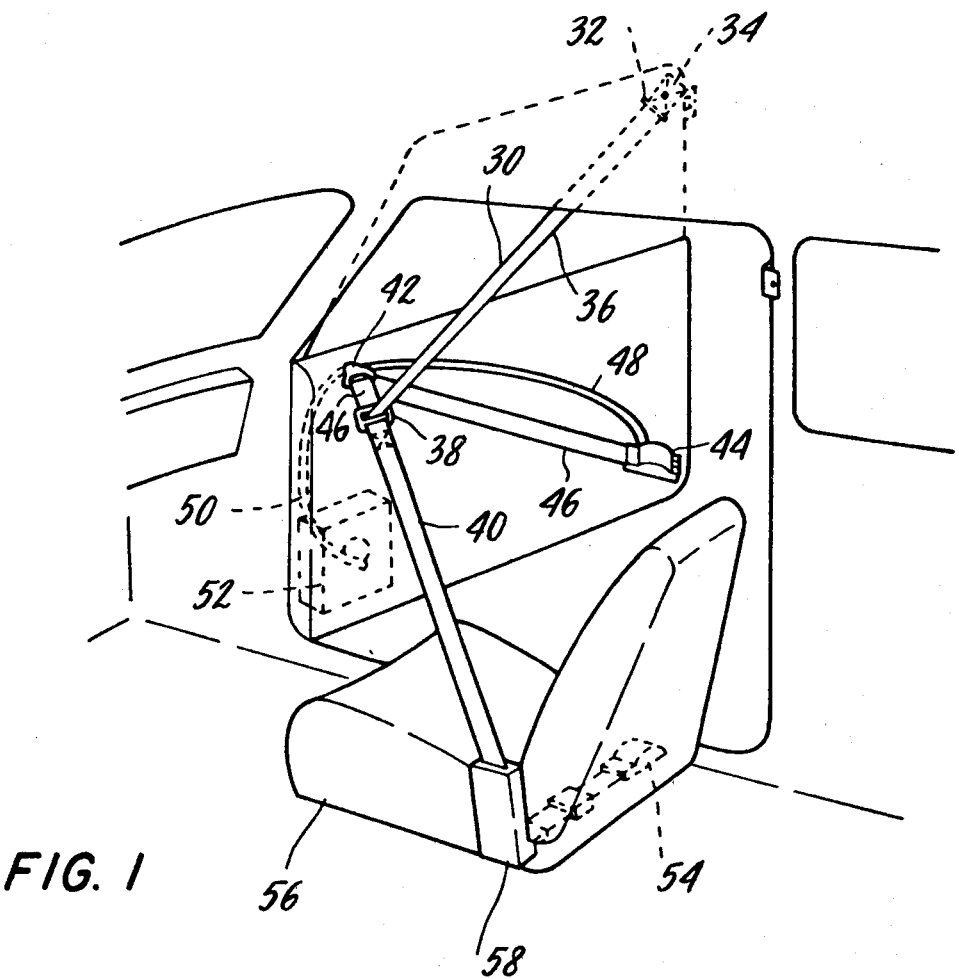
FIG. 1 is a pictorial view of an exemplary passive safety belt system in which the present invention can be used to great advantage.

The passive vehicle occupant safety belt system shown in FIG. 1 is of the so-called three-point type and comprises a restraint belt 30 that is connected at its upper, outboard end to the upper rear corner of the vehicle door by installation of a buckle tongue 32 in an emergency release buckle 34. The upper portion of the belt 30 constitutes a shoulder belt portion 36. The belt 30 passes through a D-ring 38 at the free end of a control belt 40 and then through a belt transfer ring 42 to an emergency locking retractor 44 affixed to the door adjacent the lower rear corner. The portion of the belt 30 between the D-ring 38 and the transfer ring 42 constitutes a lap belt 46 when the transfer ring 42 moves back to the rear end of a guide rail 48. The belt transfer ring 42 is connected to a slider (not shown in FIG. 1) that, in turn, is fastened to the end of a drive wire 50 that is driven by a drive device 52 mounted within the vehicle. The control belt 40 leads from an emergency locking retractor 54 installed under the vehicle seat 56 through a combination belt guide and clamp 58 affixed at the lower rear portion of the seat.

The drive device operates in response to opening and closing motions of the vehicle door by driving the belt transfer ring 42 to a restraint location at the lower rear end of guide rail 48 when the vehicle door is closed and driving the transfer ring 42 to the upper front end of the guide rail (the position shown in FIG. 1) when the vehicle door is opened. In the restraint position with the door closed, the control belt 40 is pulled in by the retractor 54, thereby positioning the safety belt in the restraining configuration, and the length of the belt is adjusted to fit the particular occupant then in the vehicle seat by the retractor 44. In the restraint configuration, both retractors lock automatically in response to a high acceleration of the belt, or acceleration of the vehicle, or both in the event of a collision or sudden stop. The belt system shown in FIG. 1 is merely exemplary of various passive belt systems with which the present invention can be used.

Figure 2:
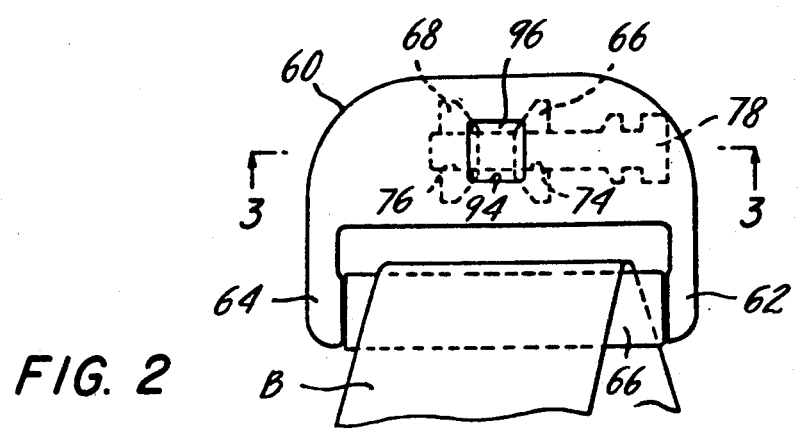
FIG. 2 is a plan view of one embodiment of belt transfer ring.
Figure 3:
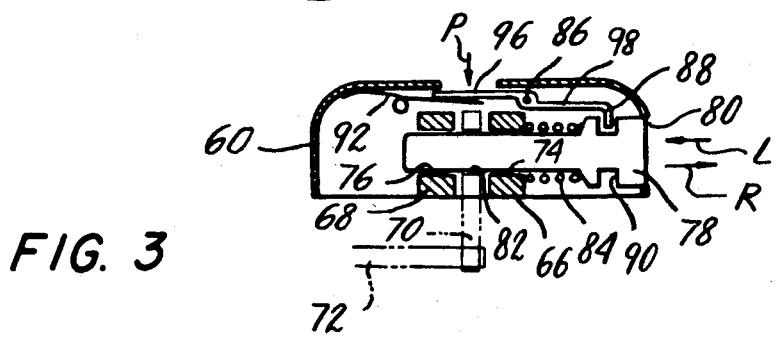
FIG. 3 is a cross-sectional view of the transfer ring shown in FIG. 2 taken generally along a plane designated by the lines 3—3 of FIG. 2 and in the direction of the arrows.

The embodiment of the invention shown in FIGS. 2 and 3 comprises a body 60 having a pair of laterally spaced-apart arms 62 and 64 supporting a roller 66 around which the belt B is wrapped. The body 60 includes a pair of lugs 66 and 68 that define a slot for receiving a coupling portion 70 of a slider 72. Each of the lugs 66 and 68 has a hole 74 and 76, respectively, that receives a coupling pin 78. The pin 78 is received into the body 60 through an opening 80 in one side and passes through the holes 74 and 76 and through a hole 82 in the coupling portion 70. A spring 84 installed between a shoulder on the pin and the lug 66 urges the coupling pin 78 in the direction indicated by the arrow R, namely, a direction in which the pin is pushed out from a slot between the lugs 66 and 68 and is thereby removed from the slot and therefore releases the belt transfer ring from the coupling portion 70.

A latch member 98 that is mounted to pivot about a pin 86 normally holds the coupling pin 78 in a coupling position (as shown in the drawings) by means of a flange 88 that is accepted within a groove 90 in the pin. The latch lever 84 is normally held in the latched condition by a spring 92, but the latch can be released by inserting a finger or suitable tool through an opening 94 in the body 60 of the body of the transfer ring and pressing an arm 96 of the latch member 98 inwardly in the direction indicated by the arrow labelled P in FIG. 3. By pushing in the arm 96, the flange 88 is dislodged from the groove 90 in the coupling pin 78, and the spring 84 pushes the coupling pin to the right, thereby releasing the belt transfer ring from the slider.

To install the belt transfer ring on the slider, the pin is released from the position shown in FIG. 3 in the manner just described, the belt transfer ring is then fitted onto the coupling portion 70, and the pin is manually pushed to the left in the direction indicated by the letter L in FIG. 3. As soon as the pin is in the position shown in FIG. 3, the latch member 98 automatically moves into the retaining position with the flange 88 received in the notch 90. The belt transfer ring can readily be released from the coupling position in the manner described, which is of particular convenience not only during the assembly of the passive restraint belt system during the manufacture of the vehicle but during any repair operations required during the life of the vehicle.

The embodiment of the invention shown in FIGS. 4 to 6 comprises a body 100 in the form of a metal casting that includes a pair of arms 102 and 104 that rotatably carry a roller 106 around which the belt B is guided. The body 100 is preferably cast from a suitable material, such as aluminum, and includes several ribs, the details of which are evident from the drawing and need not be described. The pair of ribs 108 and 110 define a slot 112 that is of a suitable shape and size to receive the coupling portion 114 of a slider 116. The slider 116 carries two pairs of wheels 118 and 120 and is connected to the drive wire 122 of the drive-guide group of the seat belt system. The slot or recess 112 in which the coupling portion 114 is accepted has considerable clearance with the flanges or ribs 108 and 110, thereby allowing the guide ring to cock or pivot in order to align the roller in an orientation generally transverse to the belt at all positions along the guide rail.

The rib 110 and a rib 122 in the guide ring body 100 define a guideway for a latch member 124, and the ribs 108, 110 and 122 have aligned holes that receive a coupling pin 126 inserted through an opening 128 in one side wall of the body 100. The coupling pin 126 is urged in a direction outwardly through the opening 128 by a spring 130 that is compressed between the rib 122 and a C-ring 132 received by the coupling pin but is normally held in a coupling position, in which it extends into the aforementioned holes (the holes in the ribs 108, 110 and 122), by the latch member 124. The coupling pin 126 only extends into, not through, the rib 108; however, as used herein the word "into" will mean "into or through." In the coupling position, the pin passes through a hole 134 in the coupling portion 114 of the slider 116. Pin 126 is held in the coupling position by the latch 124 which, in turn, is held in a latched condition by a leaf spring 136 that pushes the latch 124 in an upward position, thereby retaining a portion of the latch 124 adjacent a hole 138, through which the coupling pin passes, within a slot 140 in the coupling pin.

The latch member 124 has a lug 142 to which the shank 144 of a knob 146 is fitted. By engaging a finger with the head of the knob 146, which is accessible from the front face of the body 100, as indicated in FIG. 6, and then pushing down on the knob 146, the latch can be pushed in a downward direction against the spring 136, thereby releasing the latch from the notch 140 which, in turn, permits the spring 130 to push the coupling pin 126 out of the coupling position shown in FIG. 4. This releases the belt transfer ring from the slider.

It should be readily apparent that the release of the latch 124 in the manner just described places the transfer ring in condition for installation on the slider during the initial assembly of the passive belt system. In particular, when the pin is in the release position and the transfer ring is pushed into position on the slider, the coupling pin 126 protrudes from the opening 128 and can be manually pushed from right to left (with reference to FIG. 4), thereby pushing it through the aligned holes in the ribs 108 and 110 and the hole 134 in the slider. When the coupling pin reaches the coupling position, as shown in FIG. 4, the spring 136 urges the latch 124 into the latched condition in which a portion adjacent to the hole 138 bears against a shoulder defined by the notch 140 in the coupling pin.

The embodiment of the belt transfer ring 160 shown in FIGS. 7 to 12 comprises a body 162 which, like the embodiment shown in FIGS. 4 to 6, is preferably made by casting it from aluminum or other suitable material. It includes a pair of spaced-apart arms 164 and 166 that receive a roller 168 around which the belt B wraps. The roller 168 is tubular and is received on a shaft 170 that is composed of two pieces 172 and 174. Each of the pieces has an extension 176 and 178, respectively, that is received within a hole 180 and 182, respectively, in the legs 164 and 166. An axially extending bore 184 in one portion 172 of the shaft receives an extension 186 on the other piece 174. A spring 188 is compressed between the extension 186 and the internal end of the bore, thereby urging the two pieces 172 and 174 outwardly away from each other while enabling the pieces to be pushed toward each other so that they can be fitted in between the arms 164 and 166 of the body 162 and then pushed apart by the springs when they are in position in the receiving holes 180 and 182.

A pair of ribs 190 and 192 on the body 162 are formed with holes 194 and 196 and define between them a recess 198 in which the coupling portion of the slider 200 is received. A coupling pin 202 is received through an opening 204 in one side wall of the body 162 and through a hole 206 in a rib 208 and threaded through a speed nut 210 having a generally rectangular frame 212 and a pair of tabs 214 that define a hole 216 for acceptance of a threaded portion 202a of the coupling pin 202. The size and shape of the speed nut are such as to prevent it from rotating when the coupling pin 202 is threaded into and out of the recess 198 between the ribs 190 and 192. When the coupling pin is threaded outwardly to the position shown in FIG. 7, the belt transfer ring 160 can be fitted over the coupling portion of the slider 200, and the coupling pin, which is accessible from outside of the belt transfer ring body 162, can be threaded through the speed nut 210 and ultimately moved across the recess or slot 198 such that it is received in the hole 196 in the rib 190 and through a hole 220 in the coupling portion of the slider 200.

Figure 12:
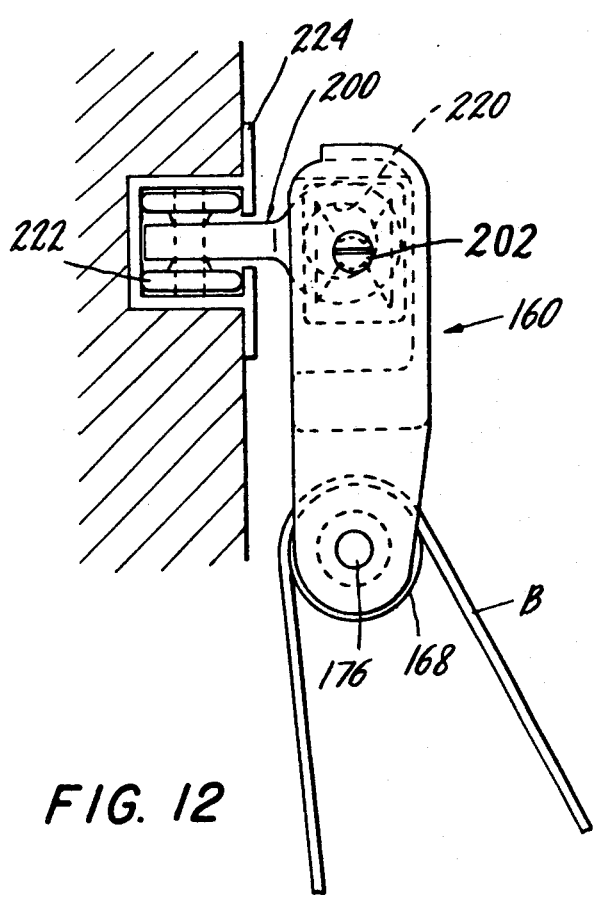
FIG. 12 is an end elevational view of the embodiment of FIGS. 7 to 12 as completely assembled.

In the fully assembled position, the belt B wraps around the roller 168, and the belt transfer ring 160 is coupled to the coupling portion 200 of the slider. As shown in FIG. 12, the slider, which is of a construction quite similar to that shown in FIG. 6, has pairs of wheels 222 that run along the inside of a channel-shaped guide rail 224.

Figure 13:
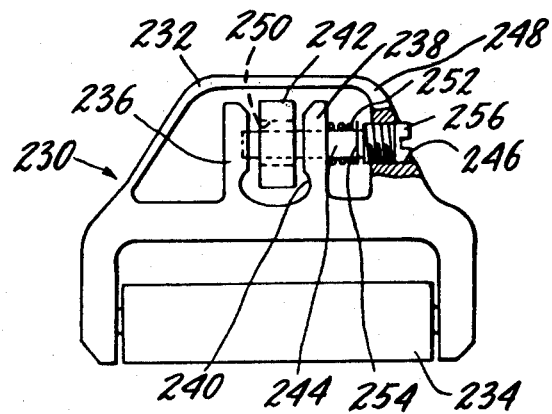
FIG. 13 is a rear elevational view of a fourth embodiment of the present invention.

The belt transfer ring 230 shown in FIG. 13 of the drawings comprises a body 232 carrying a belt turning roller 234 and having a pair of ribs 236 and 238 that define a slot 240 for reception of the connecting arm 242 of a slider. A coupling pin 244 is received through an opening 246 in one side wall 248 of the body and passes through holes in the ribs 236 and 238 and through a hole 250 in the arm 242 of the slider, thereby connecting the transfer ring 230 to the slider. A spring 252 is compressed between the rib 238 and a C-ring 254 on the pin. The pin is held in the coupling position by a retaining screw 256 that is threaded into the opening 246. For initial connection of the transfer ring to the slider, the retaining screw 256 is removed, and the spring 252 pushes the coupling pin out through the opening 246, thereby opening up the slot 240 for reception of the slider. The screw is then installed and threaded into position, thereby pushing the coupling pin 244 into a coupling position. The slot 240 is somewhat wider than the arm 242 of the slider, and the hole 250 in the slider is somewhat larger than the pin. Accordingly, the belt transfer ring 230 can pivot on the coupling pin for adjustment of the position of the roller 234 to accommodate various positions of the belt as it is transferred between the release and restraint configurations. This feature is typical of all embodiments of the invention, and will not be alluded to in connection with descriptions of other embodiments.

Figure 14:
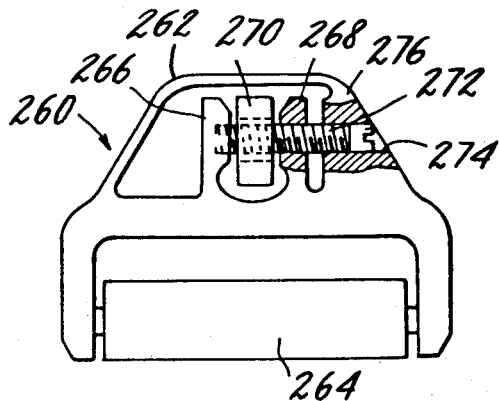
FIG. 14 is a rear pictorial view of a fifth embodiment.

The embodiment shown in FIG. 14 is very similar to the one shown in FIG. 13. The belt transfer ring 260 includes a body 262 supporting a belt-turning roller 264 and having a pair of ribs 266 and 268 defining a slot between them for reception of the slider coupling arm 270. The transfer ring 260 is connected to the coupling arm of the slider 270 by a threaded pin 272 that is inserted through a threaded opening 274 in the side wall 276 and passes through holes in the respective ribs 266 and 268 and a hole in the slider arm 270. By unthreading the pin 272 from the position shown in FIG. 14 so that it does not extend across the opening between the ribs, the belt transfer ring can be inserted over the slider coupling arm 270, and the screw is threaded in through the opening 274 until it extends through the holes in the ribs 266 and 268 and in the slider arm 270.

Figure 15:
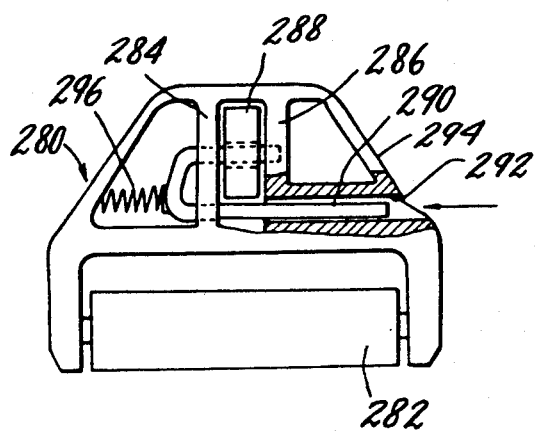
FIG. 15 is a rear pictorial view of a sixth embodiment.

The belt transfer ring 280 shown in FIG. 15 supports a belt turning roller 282 and has a pair of ribs 284 and 286 that define between them a slot opening to the rear for reception of the slider coupling arm 288. A J-shaped coupling pin 290 is accessible in the direction indicated by the arrow through an opening 292 at one side wall 294 but is urged in a direction opposite to the arrow by a compression spring 296. The spring normally retains a portion of the pin 290 that extends through holes in the ribs 284 and 286 and the slider arm 288, thereby coupling a transfer ring to the slider. For initial installation or for for removal and reinstallation, a screw driver or other suitable tool is pushed in through the opening 292 in order to shift the pin 290 in the direction indicated by the arrow against the spring, thereby removing the pin from the holes and allowing the reception or removal of the slider coupling arm into or from the slot.

Figure 17:
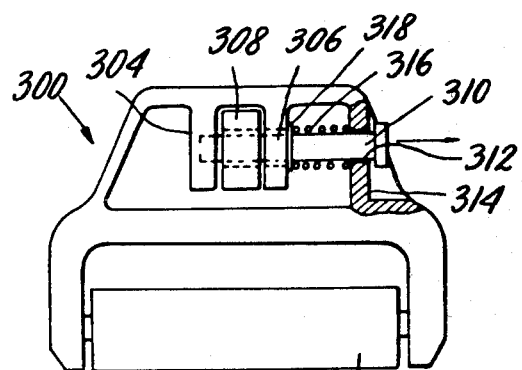
FIG. 17 is a rear pictorial view of an eighth embodiment.

The embodiment 300 shown in FIG. 17 includes the belt turning roller 302 and a pair of ribs 304 and 306 that define a slot for reception of a portion 308 of a slider. A coupling pin 310 is received through an opening 312 in the side wall 314 and is normally held in the coupling position by a compression spring 316 installed between the wall 314 and a C-ring 318. To release the pin from the coupling position, the head of the coupling pin is grasped and pulled in the direction indicated by the arrow outwardly against the force of the spring 316, thereby removing the pin from the coupling position to allow the slider to leave or enter the slot between the ribs 304 and 306.

Figure 16:
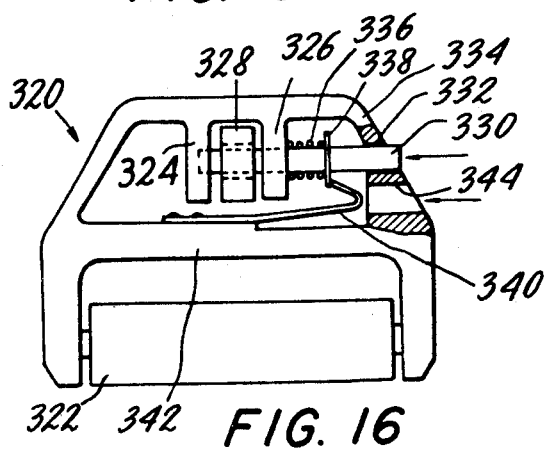
FIG. 16 is a rear pictorial view of a seventh embodiment.

The belt transfer ring 320 shown in FIG. 16 includes a belt turning roller 322 and a pair of ribs 324 and 326 that define a slot for reception of the slider portion 328. A coupling pin 330 is received through an opening 332 in the side wall 334 and couples the transfer ring to the slider in the manner of the other embodiments. A compression spring 336 is compressed between the rib 326 and a C-ring 338 on the pin, thereby urging the pin in a direction to remove it from the coupling position. A resilient latch element 340 fastened to the wall portion 342 normally retains the coupling pin in the coupling position but is accessible through an opening 344 in the wall 334 for engagement by a suitable tool which can be used to release the resilient latch member 340. Thereupon, the spring 336 will shift the pin away from the coupling position and allow the transfer ring to be coupled to or uncoupled from the slider. To couple the transfer ring to the slider, it is fitted over the slider 328, and the coupling pin 330 is pushed in the direction indicated by the arrow until it reaches the coupled position shown in FIG. 16, whereupon the resilient latch 340 automatically self-positions itself in engagement with the C-ring 338 and thereby holds the pin in the coupling position.

Figure 18:
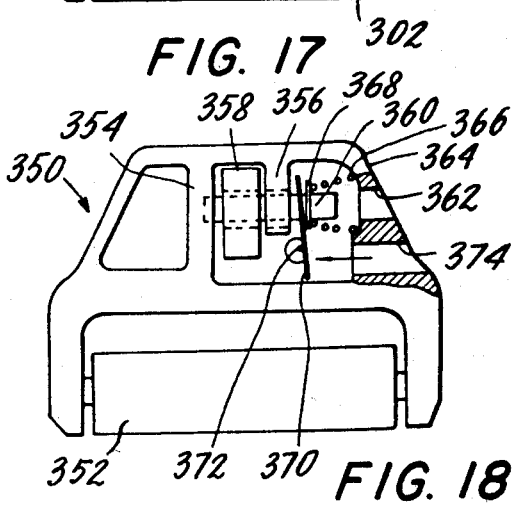
FIG. 18 is a rear pictorial view of an ninth embodiment.

The belt transfer ring 350 shown in FIG. 18 carries a belt turning roller 352 and includes a pair of ribs 354 and 356 that define a slot for reception of the slider 358. A coupling pin 360 is received through an opening 362 in the side wall 364 and is normally held in the coupling position by a compression spring 366 installed between the side wall 364 and a C-ring 368. A lever 370 pivots about a post 372 and serves as a means for disengaging the coupling pin by inserting a suitable tool through an opening 374 in the side wall 364 and pushing the lower portion of the lever below the post 372 in the direction indicated by the arrow. The upper portion of the lever will thereupon push outwardly against the C-ring 368, thereby moving the coupling pin in the direction against the spring 366. When the tool is released from lever 370, the spring 366 automatically restores the coupling pin 360 to the coupling position.

The embodiment shown in FIGS. 19-21, which is designated generally by the reference numberal 400, comprises a body 402 having a pair of arms 404 and 406 that support a belt turning roller 408 by means of an axle 410, the axle 410 being threaded at one end and being received in a threaded hole in the arm 406. The coupling arm 412 of the slider 414 is received in a slot 416 defined by ribs that extend back from the front wall 418 of the body 402 and is normally held in the coupled position by a coupling pin 420 that is received through an opening 422 in the side wall of the body. A spring 424 compressed between one of the ribs and a C-ring 426 that fits into a groove 427 in the pin 420 urges the pin in an outward direction such as to remove the pin from the coupling position and release the transfer ring from the slider, but the pin 420 is normally held in the coupling position by a latch 428. The latch 428 has a hole 430 that has a diameter slightly larger than the body of the pin 420 so that the pin can be passed through it. The pin has a groove 432, and the latch is urged in a direction to be received in the groove 432 by a leaf spring 434 that is held in place in a recess in the body 402 by a post 436 (see FIG. 20). A cap 438 is pressed onto a lug 440 on the latch 428 and is accessible from the front face of the body 402 so that the latch 428 can be pushed by a finger against the urging of the spring 434 in the direction indicated by the arrow, thereby removing the latch from engagement with the shoulder defined by the groove 432 in the pin, whereupon the spring 424 moves the pin out of the coupling position. The transfer ring 400 can be fitted to the slider or removed from the slider, as the case may be, for installation or reinstallation of the transfer ring on the slider. With the pin 420 in the release position, the transfer ring is fitted over the coupling portion 412 and the pin 420 is then pushed from right to left, whereupon when it reaches the coupling position and the spring 434 automatically pushes the latch 428 into the latched position.

Thus the present invention provides a belt transfer ring that greatly facilitates the initial installation and any removal and reinstallation for repair. It makes it possible for the belt group and the drive-guide group to be installed at different phases in the manufacture of the vehicle, and eliminates many otherwise required disassembly procedures that have to be carried out to repair the systems known in the prior art.

The above-described embodiments of the invention are intended to be merely exemplary, and numerous variations and modifications will be readily apparent to those skilled in the art without departing from the spirit and scope of the invention. All such variations and modifications are intended to be included within the scope of the invention as defined in the appended claims.

I claim:

1. In a passive vehicle occupant seat belt system having a slider that is received for movement along a guide rail and is connected to a drive device that is adapted to move it along the rail between restraint and release positions and a belt transfer ring coupled to the slider and receiving a portion of a restraint belt, the improvement characterized in that the belt transfer ring includes a body having a slot adapted to receive a coupling portion of the slider and a pair of holes, one on either side of the slot, a coupling pin removably received through an opening in one side of the body in a coupling position in which it extends through a hole in the coupling portion of the slider and through one of the holes in the body and into another of the holes in the body, thereby coupling the transfer ring to the slider, and being movable from the coupling position out of the hole in the coupling portion of the slider, in that there is a first spring urging the pin in a direction to move it out of the hole in the coupling portion of the slider, and in that there is a means for releasably retaining the pin in the coupling position, said means being operable from outside the body to enable release of the pin from the coupling position for connecting the transfer ring to and disconnecting it from the slider, the retaining means including a latch member that is shiftable between a position in engagement with the pin to retain it in the coupling position and a position out of engagement with the pin to enable the first spring to shift the pin out of the hole in the coupling portion of the slider to release the transfer ring from the slider.

2. The improvement claimed in claim 1 and further comprising a second spring urging the latch member into engagement with the pin and yieldable to release the latch member from the pin, a portion of the member being accessible from outside the body to be moved in a direction generally opposed to the urging of the second spring.

3. The improvement claimed in claim 2 wherein the latch member includes an elongated hole that receives the pin, and wherein the pin includes a groove adapted releasably to receive a portion of the latch member adjacent the hole and thereby be engaged and held in the coupling position, and wherein the latch member is slideable to disengage it from the groove.

4. The improvement according to claim 1 wherein the latch member is resilient and is self-positionable in engagement with an abutment on the pin.

* * * * *